(12) United States Patent
Pasek et al.

(10) Patent No.: US 6,270,066 B1
(45) Date of Patent: Aug. 7, 2001

(54) ENGINE MOUNT WITH VERTICAL ALIGNMENT

(75) Inventors: Richard R. Pasek, Lapeer; Thomas M. Knowles, Sterling Heights; Stephen M. Leitner, Oxford; Brian D. Dwyer, Royal; Stephen D. Donohue, Novi, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/467,856

(22) Filed: Dec. 20, 1999

(51) Int. Cl.$^7$ ........................................................ F16F 5/00
(52) U.S. Cl. .................. 267/140.12; 267/140.4; 180/299; 74/606 R
(58) Field of Search ............................ 267/140.12, 140.4, 267/141.2, 276, 281, 293; 248/637, 638, 659, 674, 675; 80/299, 300, 291; 74/511 R, 606 R

(56) References Cited

U.S. PATENT DOCUMENTS

| | | | |
|---|---|---|---|
| 3,139,250 | * 6/1964 | Turlay | 248/10 |
| 5,035,397 | * 7/1991 | Yamada | 248/638 |
| 5,074,374 | * 12/1991 | Ohtake et al. | 180/312 |
| 5,158,271 | * 10/1992 | Hein | 267/281 |
| 5,174,541 | 12/1992 | Hutter et al. | 248/636 |
| 5,305,847 | 4/1994 | Mefford | 180/292 |

* cited by examiner

Primary Examiner—R Pasek
Assistant Examiner—Pamela J. Rodriguez
(74) Attorney, Agent, or Firm—Mark P. Calcaterra

(57) ABSTRACT

An engine mount with vertical alignment for mounting a powertrain member on a chassis of a vehicle. The engine mount with vertical alignment has a mount body which has a hollow core for housing a metal core. The metal core has at least one channel for accepting a vertically placed bolt, the metal core being held in position by a rubber mount. The metal core interfaces with a mounting bracket that is connected to a powertrain member for vertical mounting onto a chassis.

4 Claims, 3 Drawing Sheets

ENGINE MOUNT WITH VERTICAL ALIGNMENT

TECHNICAL FIELD

This invention relates generally to engine mounts for mounting an engine/powertrain onto a chassis of an automobile, and more particularly to an engine mount with vertical alignment for accomplishing same.

DISCUSSION

Generally speaking, the process of mounting an automobile engine which includes the engine and transmission (the powertrain assembly) is from underneath the vehicle. In the conventional manner, the mounting of an engine is carried out by the mating of mounting components wherein the engine is brought up to a specified height, the mounting components are appropriately aligned and thereafter fasteners and/or bolts are used to tighten the mounting components. In the conventional use of spool mounts for example, the bolting that is required is carried out in at least two positions, in a horizontal direction wherein a pair of cantilevered bolts extend from two substantially opposite positions of the chassis requiring the operator to control the fore/aft, cross car and vertical axes when inserting the engine. In conventional applications the fore/aft and cross car axes are more easily controlled in the engine insertion process, with the vertical axis being more difficult to control and therein, being prone to result in failure upon insertion due to vertical tolerances which require more precise insertion parameters. As a result of these vertical tolerances an unacceptable first time capability (FTC) results therein leading to higher costs both in labor and time. Additionally, because of the position of the horizontal cantilevered bolts, further difficulties result in component failure due to bad joints and from the cantilevered bolts being in shear once the engine is mounted.

Accordingly, it is therefore desirable to provide an engine mount with vertical alignment that can alleviate the above-referenced difficulties.

SUMMARY OF THE INVENTION

Accordingly, it is an object of the present invention to provide an engine mount with vertical alignment to improve first time capability.

It is a further object of the present invention to provide an engine mount with vertical alignment that reduces production costs both in time and labor.

It is a further object of the present invention to provide an engine mount with vertical alignment that reduces material costs.

It is a further object of the present invention to provide an engine mount with vertical alignment that removes the tolerances both on engine placement and on decking.

It is a further object of the present invention to provide an engine mount with vertical alignment that reduces failure.

It is a further object of the present invention to provide an engine mount with vertical alignment that removes the necessity to vertically align the powertrain assembly prior to decking.

These and other objects and advantages of the invention are obtained by providing an engine mount with vertical alignment for mounting a powertrain member on a chassis of a vehicle. The engine mount with vertical alignment has a mount body which has a hollow core for housing a metal core. The metal core has at least one channel for accepting a vertically placed bolt, the metal core being held in position by a rubber mount. The metal core interfaces with a mounting bracket that is connected to a powertrain member for vertical mounting onto a chassis.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict an illustrated embodiment of the present invention and are not therefore to be considered limiting in scope, the invention will be described and explained with additional specificity and detail through use of the accompanying drawings in which.

DETAILED DESCRIPTION OF THE PREFERRED EMBODIMENTS

The present invention is directed toward an engine mount 10 with vertical alignment for mounting an engine, which for purposes of this application includes the engine and transmission and all of the components otherwise incorporating the powertrain assembly. The present invention as hereinafter detailed should not be interpreted as limiting the breadth of potential uses in other vehicles or in other commercial fields of endeavor for other intended purposes.

Figure 1:
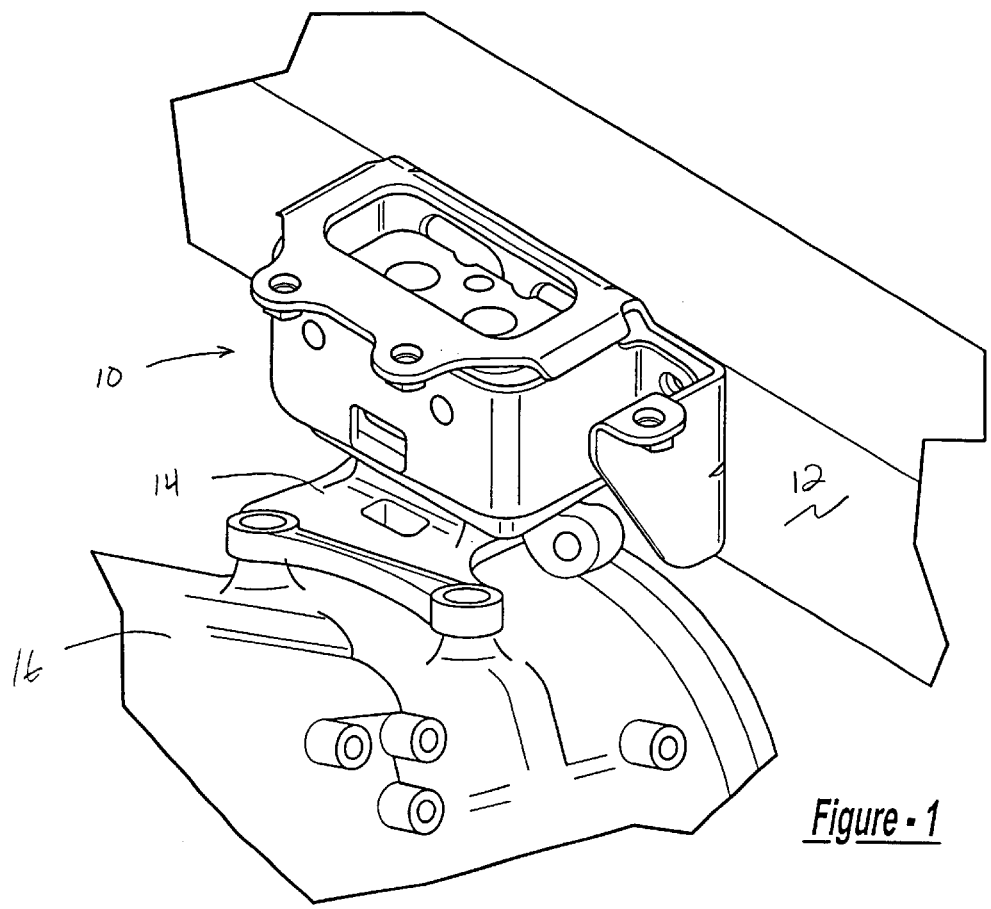
FIG. 1 is a perspective view of the engine mount system according to the present invention.

The engine mount 10 with vertical alignment in accordance with the illustrated embodiment of FIG. 1 is illustrated as mounting a manual transmission 16 of a powertrain assembly to a left side rail assembly 12. A mounting bracket 14' is provided for mounting the transmission 16 to the engine mount 10. It should be understood that an automatic or manual transmission can be incorporated into a powertrain assembly. As will be discussed in more detail below, the engine mount 10 should not be considered as being limited to a powertrain assembly having a manual versus an automatic transmission.

Figure 2:
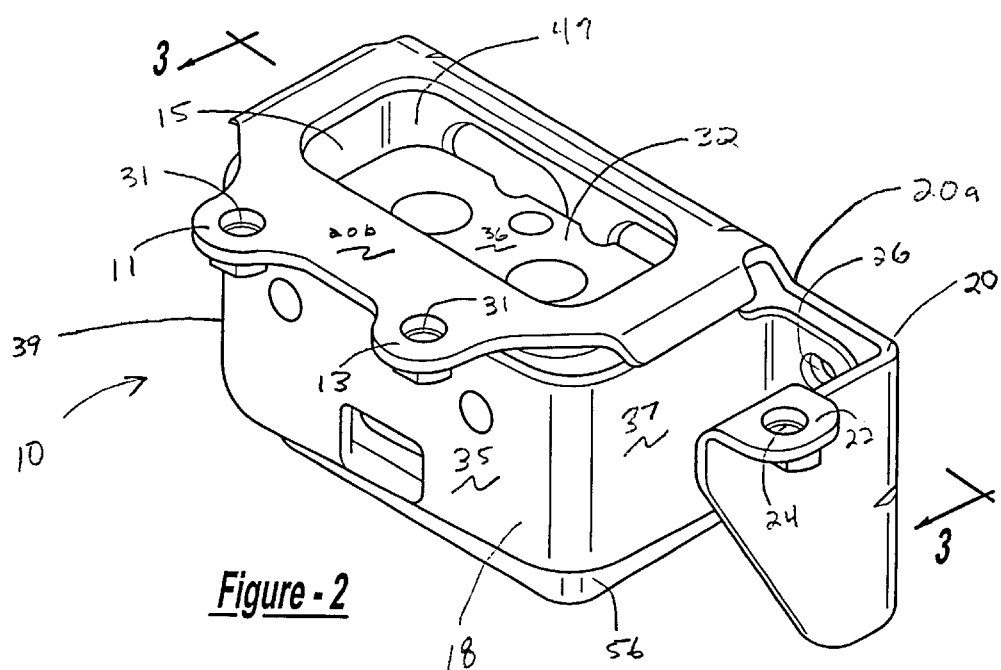
FIG. 2 is a perspective view of the engine mount with vertical alignment according to the principles of the present invention.
Figure 3:
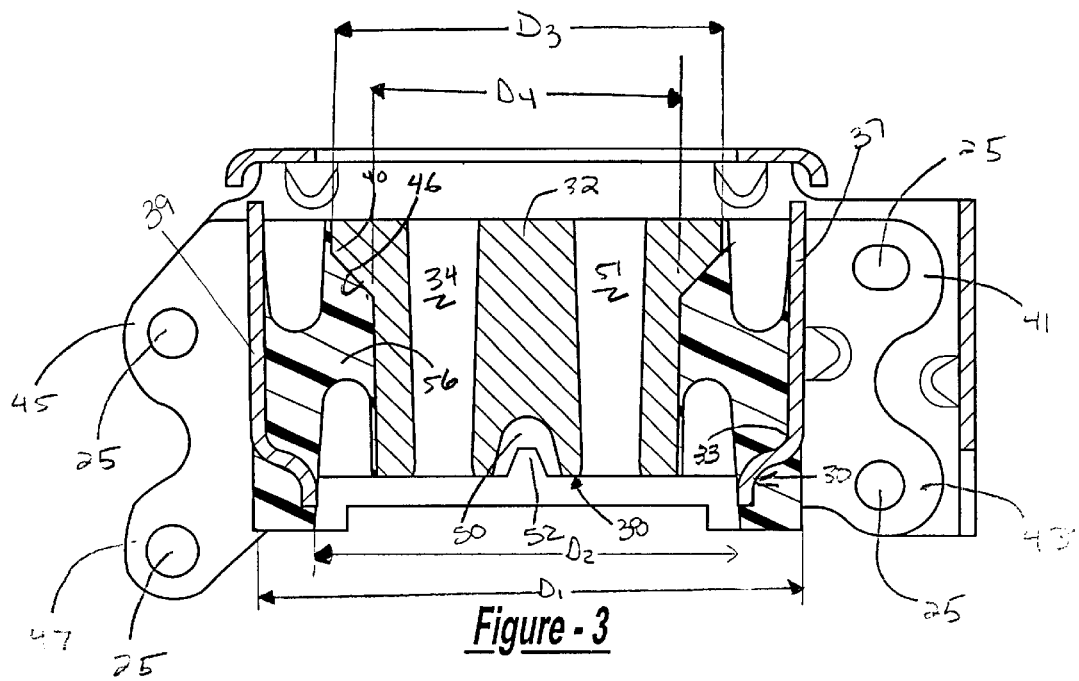
FIG. 3 is a cross-sectional view taken along line 3—3 of FIG. 2 of the engine mount according to the principles of the present invention.

Turning to FIGS. 2 and 3, the engine mount 10 in the illustrated embodiment includes an outer bracket 20 which is welded to an inner bracket 18. Outer bracket 20 includes a flanged portion 22 having an aperture 24 for substantial engagement with a battery tray (not shown). The outer bracket 20 also includes a base portion 20a having a set of four apertures 26 (FIG. 2, only one shown) which correspond to a set of four apertures 25 (FIG. 3) contained on the inner bracket 18, and to a set of four apertures (not shown) contained on the rail assembly 12 for mounting the engine mount 10 to the rail assembly 12. The outer bracket 20 also includes an upper portion 20b extending transversely to said base portion 20a and including a pair of tab-like extensions 11 and 13 that each include an aperture 31 which correspond to, support and engage an air cleaner (not shown) and a power distribution center (not shown). The upper portion 20b of the outer bracket 20 also includes an opening 15 having a substantially rectangular shape. The outer bracket 20 for purposes of the illustrated embodiment may take on several configurations, these configurations being dependent upon the vehicle and/or intended purpose.

Figure 4:
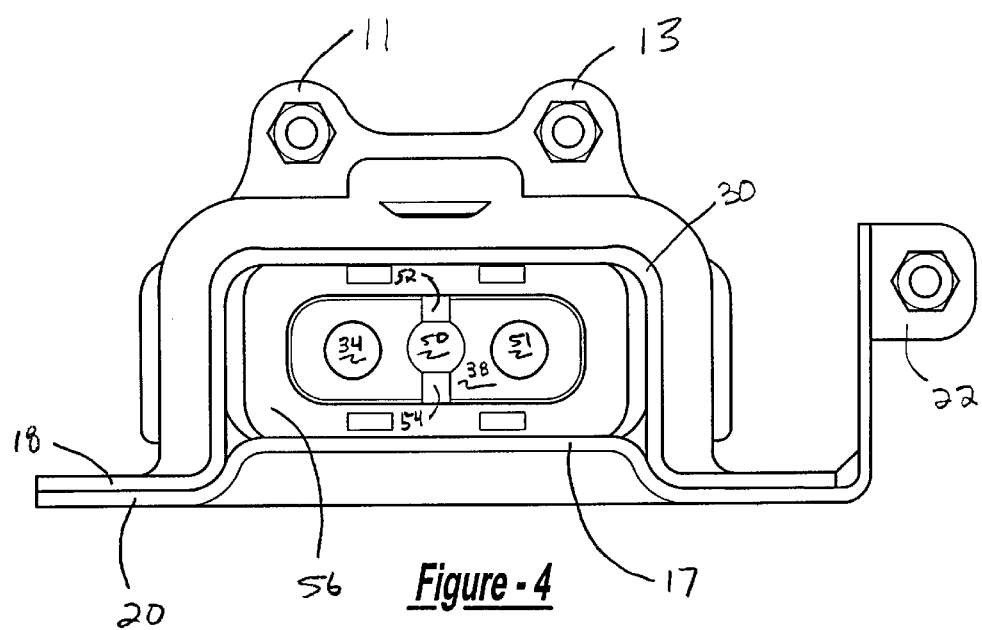
FIG. 4 is a bottom view of the engine mount with vertical alignment according to the principles of the present invention.

Returning to FIGS. 2 and 3, the inner bracket 18 has a front wall 35, a first side wall 37 and a second side wall 39. The first side wall 37 and the second side wall 39 each have a pair of flanges (FIG. 3) 41 and 43, 45 and 47, respectively which include the apertures 25 previously described. The front wall 35 and each side wall 37, 39 at a common point 33 (FIG. 3) define a reduced diameter portion 30 from a first diameter $D_1$ to a second inner diameter $D_2$. This reduction is mimicked in the outer bracket 20 when the inner bracket 18 and the outer bracket 20 are welded together. More particularly, there is an inwardly protruding bend portion 17 (FIG. 4) in the outer bracket 20 which corresponds to the reduction in the front wall 35, first side wall 37 and second side wall 39 of the inner bracket 18 when the inner bracket 18 and outer bracket 20 are welded together. Additionally, when the inner bracket 18 and the outer bracket 20 are welded together there is formed a circumferentially complete reduced diameter portion (FIG. 4) defined by the reduced diameter portion 30 and the inwardly protruding bend portion 17. Additionally, when inner bracket 18 and outer bracket 20 are welded together a substantially hollow cavity houses an inner metal core 32. The inner metal core 32 includes two channels 34 and 51 that are tapered in configuration such that the diameter of each channel from the top 36 of the metal core 32 to the bottom 38 (FIG. 4) generally decrease in diameter. The inner metal core 32 has an exterior configuration such that at a point 40 the inner metal core 32 reduces from an exterior diameter $D_3$ to an interior diameter $D_4$ therein forming a tapered ledge 46. The exterior diameter $D_3$ of the inner metal core 32 at the point 40 is preferably of a greater diameter than the circumferentially complete reduced diameter portion 30, 17 (FIG. 4). The inner metal core 32 also includes on its bottom face 38 (FIG. 4) a shaped depression 50 which includes corresponding grooves 52 and 54 that oppose either side of the shaped depression 50.

Returning to FIGS. 2, 3 and 4, the inner metal core 32 is free floating within the hollow portion defined by the inner and outer brackets 18, 20 such that there is no metal-to-metal contact between the inner metal core 32 and the inner bracket 18, or the outer bracket 20 when the inner metal core 32 is positioned at a predetermined location within the hollow cavity. The inner metal core 32 is supported in its predetermined position by a rubber molded insert 56. The rubber molded insert 56 extends completely around the inner metal core 32 such that the inner metal core 32 is rigidly held in position in the hollow cavity defined by the inner bracket 18 and outer bracket 20. As shown in FIG. 3, the rubber molded insert 56 extends beyond the hollow cavity in a manner that extends beyond the lower edge of the reduced diameter portion 30 of the sidewalls 37 and 39 of the inner bracket 18.

Figure 5:
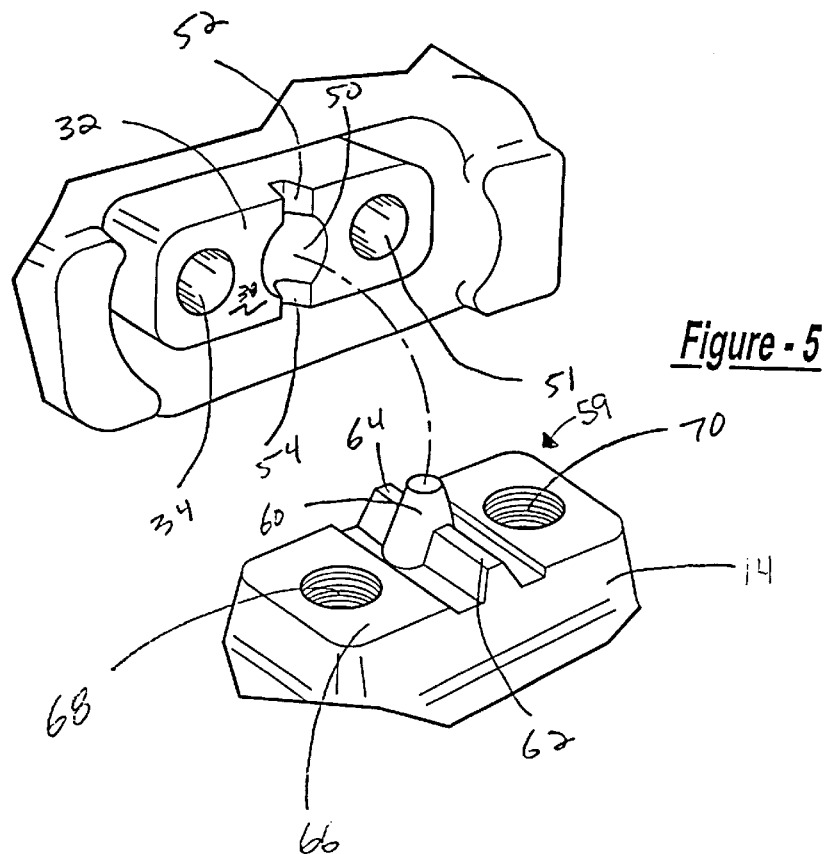
FIG. 5 is a clam shell view of a transmission bracket and engine mount with vertical alignment according to the principles of the present invention.
Figure 6:
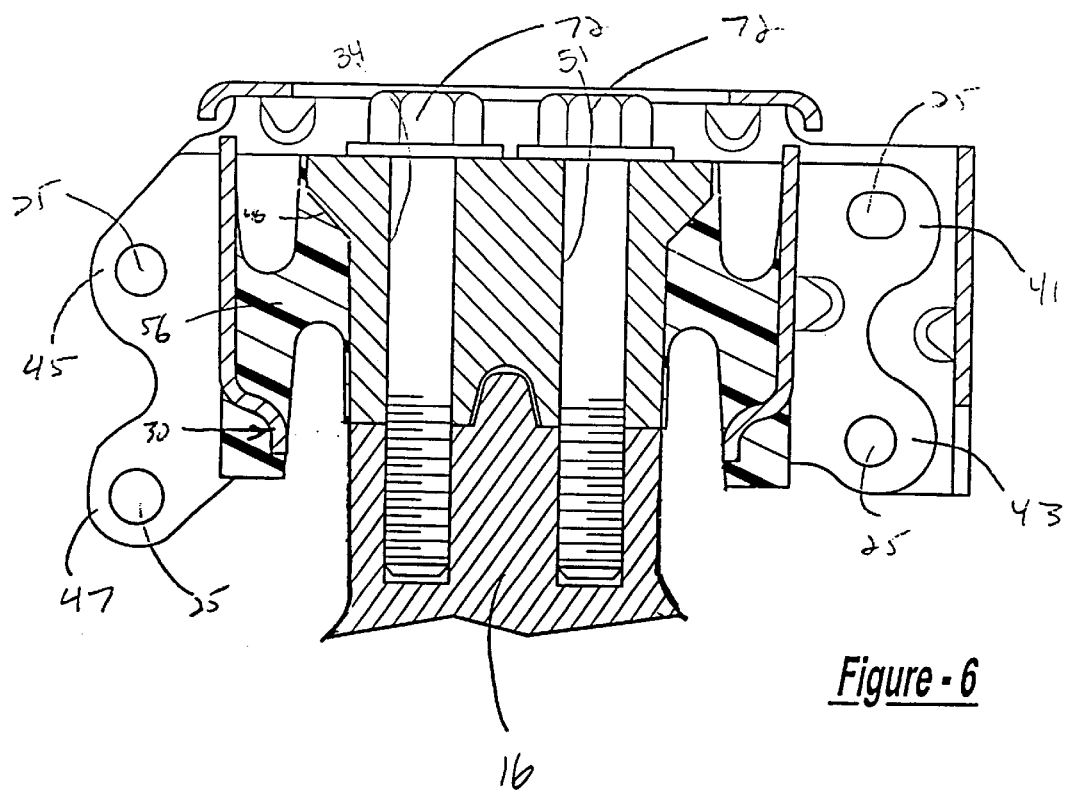
FIG. 6 is a partial cross-sectional view of a transmission bracket and engine mount with vertical alignment showing the mounting bolts according to the principles of the present invention.

Turning to the method of assembly and operation, and referring to the illustrated embodiments in FIGS. 5 and 6, the engine mount 10 is fabricated by welding the outer bracket 20 to the inner bracket 18 with the inner metal core 32 in place and the rubber molded insert 56 being molded into position. It should be understood that the engine mount 10 can be fabricated in an assembly line therein providing lower costs of assembly and components as compared to the prior art. Following fabrication, the appropriate transmission bracket 14 is mounted to the transmission 16 of the powertrain assembly. Whether an automatic or manual transmission is used, a common interface represented in FIG. 5 is incorporated into the transmission bracket 14. More particularly, as represented in FIG. 5 the transmission bracket 14 has a mating portion 59 configured corresponding to the bottom 38 of the inner metal core 32. Specifically, the mating portion 59 of the transmission bracket 14 has a projection 60 having a pair of ridges 62 and 64 disposed on opposite sides of the projection 60 and an upper surface 66 having a pair of threaded apertures 68 and 70. Upon union between the inner metal core 32 and the transmission bracket 16 the projection 60 mates with the shaped depression 50, the ridge 62 mates with the groove 52, the ridge 64 mates with the ridge 54 and the channels 34 and 51 line up with the threaded apertures 68 and 70, respectively.

Returning to FIGS. 5 and 6, the engine mount 10 is bolted to the left-hand rail assembly 12. The powertrain assembly is lifted into the vehicle such that as reflected in the illustrated embodiment of FIG. 5, the interface between the transmission bracket 14 and the inner metal core 32 of the engine mount 10 occurs. Two bolts 72 (FIG. 6) are lowered into position via the channels 34 and 51, the bolts 72 are then tightened to draw the powertrain assembly into a fixed position.

It should be understood that in the event of failure of the rubber molded insert 56, the configuration of the exterior of the inner metal core 32 at the point 40 is such that the exterior diameter $D_3$ of the inner metal core 32 is such that the ledge 46 will engage the inner bracket 18 and the outer bracket 20 due to the exterior diameter $D_3$ being greater than the circumferentially complete reduced inner diameter $D_2$ therein precluding a complete mount failure.

It should also be understood that the engine mount with vertical alignment 10 removes the necessity to vertically align the powertrain assembly prior to decking. It should also be understood that the engine mount with vertical alignment 10 serves the vertical alignment function that is removed by use of the engine mount with vertical alignment 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A mount device with a vertical alignment for mounting a powertrain member including a bracket on a chassis of a vehicle comprising;

a mount body, said mount body having a hollow cavity, said mount body being adapted to fixedly mount onto the chassis;

a metal core, said metal core being disposed within said hollow cavity, said metal core having at least one channel adapted to accept a substantially vertically placed bolt;

a rubber mount, said rubber mount fixedly retaining said metal core within said hollow cavity, said metal core being adapted to interface with the bracket of the powertrain member;

said mount body has a maximum and minimum inner diameter, said minimum inner diameter being greater than an exterior diameter of said metal core;

whereby in the vertical mounting of the powertrain member, said metal core and said mounting bracket interface such that said bolt is placed through said channel and into said bracket of the powertrain member.

2. A mount with vertical alignment for mounting a powertrain member including a transmission mounting bracket on a chassis of a vehicle comprising;

an inner bracket and an outer bracket affixed together, said inner bracket and said outer bracket forming a hollow cavity with a reduced diameter portion;

a metal core having a top and a bottom portion, said metal core having at least one channel being adapted to accept a substantially vertically placed bolt, said bolt being retained by said top portion of said metal core;

a rubber mount fixedly retaining said metal core within said hollow cavity;

said bottom of said metal core being adapted to interface with the transmission mounting bracket affixed to the powertrain member;

whereby in the vertical placement of the powertrain member, said bottom of said metal core interfaces with the mounting bracket, said bolt being threaded into the mounting bracket for mounting the powertrain member to the chassis.

3. The engine mount with vertical alignment according to claim 2, wherein said metal core has an exterior diameter greater than said reduced diameter of said hollow cavity.

4. The engine mount with vertical alignment according to claim 2, wherein said bottom of said metal core further comprises a shaped depression and opposed grooves which meet with corresponding projection and opposed ridges formed on the mounting bracket.

* * * * *